(12) United States Patent  
Guo (10) Patent No.: US 6,686,852 B1  
(45) Date of Patent: Feb. 3, 2004

(54) KEYPAD LAYOUT FOR ALPHABETIC CHARACTER INPUT

(75) Inventor: Jin Guo, Sunnyvale, CA (US)

(73) Assignee: Motorola, Inc., Schaumburg, IL (US)

( * ) Notice: Subject to any disclaimer, the term of this patent is extended or adjusted under 35 U.S.C. 154(b) by 456 days.

(21) Appl. No.: 09/662,686

(22) Filed: Sep. 15, 2000

(51) Int. Cl.[7] .............................................. H03M 11/00
(52) U.S. Cl. ......................................... 341/22; 379/368
(58) Field of Search ............................... 341/22, 28, 23; 400/109, 110, 484; 345/171; 349/368

(56) References Cited

U.S. PATENT DOCUMENTS

| | | | | |
|---|---|---|---|---|
| 4,737,040 A | * | 4/1988 | Moon | 400/110 |
| 4,872,196 A | * | 10/1989 | Royer et al. | 455/564 |
| 5,619,563 A | * | 4/1997 | Hsiao | 379/368 |
| 5,945,928 A | * | 8/1999 | Kushler et al. | 341/28 |
| 6,005,498 A | * | 12/1999 | Yang et al. | 341/23 |
| 6,009,444 A | * | 12/1999 | Chen | 715/535 |
| 6,054,941 A | * | 4/2000 | Chen | 341/28 |
| 6,098,086 A | * | 8/2000 | Krueger et al. | 715/535 |

* cited by examiner

Primary Examiner—Timothy Edwards  
Assistant Examiner—Hung Dang  
(74) Attorney, Agent, or Firm—Romi N. Bose; Hisashi D. Watanabe (57) ABSTRACT

A layout for a keypad is provided that has a highly regular arrangement of alphabetic characters for ease of use thereof and a highly efficient distribution of the characters to minimize the instances where multiple words are formed from a given sequence of key inputs. The keypad layout is for the Chinese phonetic Bopomofo alphabet. The keypad layout utilizes a top-down approach to provide the desired regularity so that commonly known sets of the characters appear in an assigned column therefor but not in other columns. Further, the character groups have their sets distributed amongst the key columns in a balanced fashion to minimize ambiguity in character input. Where a separate navigation key is not available, an alternative nine-key layout utilizing the above principles is disclosed.

25 Claims, 6 Drawing Sheets

FIG. 1

| 1-B-D-A | 2-G-J-AI-I | 3-ZH-Z-AN |
|---|---|---|
| 4-P-T-O | 5-K-Q-EI-U | 6-CH-C-EN |
| 7-M-N-E | 8-H-X-AU-IU | 9-SH-S-ANG |
| *-F-L-EH | 0 —— OU  V-NG-GN | #-R —— ENG  ER |

FIG. 2

| 1-B-P-M-F | 2-D-T-N-L | 3-G-K-H -J-Q-X |
|---|---|---|
| 4-ZH-CH-SH-R | 5-Z-C-S | 6-A-O-E-EH |
| 7-AI-EI-AU-OU | 8-AN-EN-ANG-ENG-ER | 9-I-U-IU |
| * | 0 | # |

-PRIOR ART-

FIG. 3

| 1-B-F-N-A | 2-G-J-AI-I | 3-ZH-Z-AN-ER |
| --- | --- | --- |
| 4-P-D-L-O | 5-K-Q-EI-U | 6-CH-C-EN -ENG |
| 7-M-T — E -EH | 8-H-X-AU-IU -OU | 9-SH-S-ANG -R |
| * | 0 | # |

-PRIOR ART-

FIG. 4

| | 310 | 311 | 312 |
| --- | --- | --- | --- |
| 0 | | ㄐ 3110 | ㄠ 3120 |
| 1 | | ㄑ 3111 | ㄡ 3121 |
| 2 | | ㄒ 3112 | ㄞ 3122 |
| 3 | | ㄓ 3113 | ㄣ 3123 |
| 4 | | ㄔ 3114 | ㄤ 3124 |
| 5 | ㄅ 3105 | ㄕ 3115 | ㄥ 3125 |
| 6 | ㄆ 3106 | ㄖ 3116 | ㄦ 3126 |
| 7 | ㄇ 3107 | ㄗ 3117 | ー 3127 |
| 8 | ㄈ 3108 | ㄘ 3118 | ㄨ 3128 |
| 9 | ㄉ 3109 | ㄙ 3119 | ㄩ 3129 |
| A | ㄊ 310A | ㄚ 311A | ㄎ 312A |
| B | ㄋ 310B | ㄛ 311B | ㄫ 312B |
| C | ㄌ 310C | ㄜ 311C | ㄏ 312C |
| D | ㄍ 310D | ㄝ 311D | |
| E | ㄋ 310E | ㄞ 311E | |
| F | ㄏ 310F | ㄟ 311F | |

FIG. 5

| ㄅ | U+3105 | BOPOMOFO LETTER B |
| --- | --- | --- |
| ㄆ | U+3106 | BOPOMOFO LETTER P |
| ㄇ | U+3107 | BOPOMOFO LETTER M |
| ㄈ | U+3108 | BOPOMOFO LETTER F |
| ㄉ | U+3109 | BOPOMOFO LETTER D |
| ㄊ | U+310A | BOPOMOFO LETTER T |
| ㄋ | U+310B | BOPOMOFO LETTER N |
| ㄌ | U+310C | BOPOMOFO LETTER L |
| ㄍ | U+310D | BOPOMOFO LETTER G |
| ㄎ | U+310E | BOPOMOFO LETTER K |
| ㄏ | U+310F | BOPOMOFO LETTER H |
| ㄐ | U+3110 | BOPOMOFO LETTER J |
| ㄑ | U+3111 | BOPOMOFO LETTER Q |
| ㄒ | U+3112 | BOPOMOFO LETTER X |

*FIG. 6*

| ㄓ | U+3113 | BOPOMOFO LETTER ZH |
| --- | --- | --- |
| ㄔ | U+3114 | BOPOMOFO LETTER CH |
| ㄕ | U+3115 | BOPOMOFO LETTER SH |
| ㄖ | U+3116 | BOPOMOFO LETTER R |
| ㄗ | U+3117 | BOPOMOFO LETTER Z |
| ㄘ | U+3118 | BOPOMOFO LETTER C |
| ㄙ | U+3119 | BOPOMOFO LETTER S |
| ㄚ | U+311A | BOPOMOFO LETTER A |
| ㄛ | U+311B | BOPOMOFO LETTER O |
| ㄜ | U+311C | BOPOMOFO LETTER E |
| ㄝ | U+311D | BOPOMOFO LETTER EH |
| ㄞ | U+311E | BOPOMOFO LETTER AI |
| ㄟ | U+311F | BOPOMOFO LETTER EI |
| ㄠ | U+3120 | BOPOMOFO LETTER AU |
| ㄡ | U+3121 | BOPOMOFO LETTER OU |

*FIG. 7*

| | | |
|---|---|---|
| ㄢ | U+3122 | BOPOMOFO LETTER AN |
| ㄣ | U+3123 | BOPOMOFO LETTER EN |
| ㄤ | U+3124 | BOPOMOFO LETTER ANG |
| ㄥ | U+3125 | BOPOMOFO LETTER ENG |
| ㄦ | U+3126 | BOPOMOFO LETTER ER |
| ㄧ | U+3127 | BOPOMOFO LETTER I |
| ㄨ | U+3128 | BOPOMOFO LETTER U |
| ㄩ | U+3129 | BOPOMOFO LETTER IU |
| ㄪ | U+312A | BOPOMOFO LETTER V |
| ㄫ | U+312B | BOPOMOFO LETTER NG |
| ㄬ | U+312C | BOPOMOFO LETTER GN |

|        | 26      | 34     | 28    |
|--------|---------|--------|-------|
| TYPE 1 | INITIAL |        |       |
| TYPE 2 | INITIAL | MIDDLE |       |
| TYPE 3 | INITIAL | MIDDLE | FINAL |
| TYPE 4 |         | MIDDLE | FINAL |
| TYPE 5 |         |        | FINAL |

*FIG. 13*

|    | 42          | 50           | 52            |
|----|-------------|--------------|---------------|
| 44 | 1-B(1)-D(5) | 2-G(09)-J(12)| 3-ZH(15)-Z(19)|
| 46 | 4-P(2)-T(6) | 5-K(10)-Q(13)| 6-CH(16)-C(20)|
| 48 | 7-M(3)-N(7) | 8-H(11)-X(14)| 9-SH(17)-S(21)|
| 36 | *-F(4)-L(8) |              | #-R(18)       |

*FIG. 14*

|    | 42       | 50       | 52               |
|----|----------|----------|------------------|
| 44 | 1-A(22)  | 2-AI(26) | 3-AN(30)         |
| 46 | 4-O(23)  | 5-EI(27) | 6-EN(31)         |
| 48 | 7-E(24)  | 8-AU(28) | 9-ANG(32)        |
| 30 | *-EH(25) | 0-OU(29) | #-ENG(33) ER(34) |

*FIG. 15*

|   | 50       |   |
|---|----------|---|
| 1 | 2-I(35)  | 3 |
| 4 | 5-U(36)  | 6 |
| 7 | 8-IU(37) | 9 |
| * | 0        | # |

| | 50 | |
|---|---|---|
| 1 | 2 | 3 |
| 4 | 5 | 6 |
| 7 | 8 | 9 |
| * | 0-V(38)-NG(39)-GN(40) | # |

| 42 | 50 | 52 |
|---|---|---|
| 1-B-D-A | 2-G-J-AI-I | 3-ZH-Z-AN |
| 4-P-T-O | 5-K-Q-EI-U | 6-CH-C-EN |
| 7-M-N-E | 8-H-X-AU-IU | 9-SH-S-ANG |
| 7-F-L-EH | 8 ———— OU<br>V-NG-GN | 9-R ———— ENG<br>ER |
| * | 0 | # |

KEYPAD LAYOUT FOR ALPHABETIC CHARACTER INPUT

FIELD OF THE INVENTION

The invention relates to a keypad layout for alphabetic character input and, more particularly, to a keypad that has alphabetic characters arranged and distributed on the keys thereof in a highly regular and efficient manner.

BACKGROUND OF THE INVENTION

The arrangement and distribution of alphabetic characters on alphanumeric keypads so that the keypad is easy to use and does not create excessive ambiguity in creating multiple words with the same key strokes is difficult to achieve due to the small size of the keypad. This problem is especially pronounced in those alphabets having greater numbers of characters than those of Roman based alphabets, e.g. twenty-six Roman letter alphabet. The alphabetic character layout is more easily done on keyboards for desktop systems adapted for two-handed input as the keyboard generally has thirty-six alphanumeric keys readily available for character placement. As is apparent, the fewer number of keys in keypads complicates layout designs, especially with those languages having large alphabets.

One goal in arriving at a keypad layout is that the characters appear on the keys in a regular or intuitive arrangement so that users can readily become familiar with where the different characters are located in the keypad. In this manner, the keypad is easier to use and allows the user to become more proficient in its use for fast and accurate input of the characters. The other goal is to distribute the characters efficiently so as to minimize the ambiguity created when a given sequence of key inputs is undertaken to form a word. Ambiguity is created when the same sequence can create multiple words. Each time the user has to go through the process of choosing a word among several, overall input speed and efficiency is slowed particularly where the number of words to be selected is high. Accordingly, it is desirable to distribute the characters such that a minimum of such multiple word formations can be created from a given sequence of key inputs.

One problem that is noted is that the most efficient distribution of characters on a keypad may not produce a very regular arrangement for ease of use of the keypad. On the flip side, the most regular arrangement of the characters on the keys will generally not be the most efficient distribution of the characters for low input ambiguity. For instance, the typical character layout on a keypad for the twenty-six Roman letter alphabet is having the characters appear in alphabetical order on a row-by-row basis. As is apparent, this is a highly regular layout that allows a user to quickly become familiar with the location of the letters in the keypad particularly with users having native languages that are read in a left to right fashion. On the other hand, the ambiguity of this layout is very high as commonly used letters appear on the same key and characters that are less commonly used also appear together, e.g. letters G, H, I on key 4 vs. letters W, X, Y on key 9. So, for example, the same sequence of key inputs that produces the word "good" will also produce six other words for a total of seven possible valid candidates from the same key stroke sequence.

Also, and as mentioned, this problem of finding the optimum balance between regularity and efficiency in the arrangement and distribution of alphabetic characters on a keypad is exacerbated where the number of characters in the alphabet is higher than that of the Roman alphabet. One such example is Chinese alphabets, and in particular the Chinese phonetic alphabet called "Bopomofo." Bopomofo is the first Mandarin Chinese phonetic alphabet officially endorsed by the Chinese government as a National Standard and has been enforced by the public school education system for several decades. It is still in widespread use today. Bopomofo has a set of 40 phonetic symbols which creates organizational problems in the small keypad setting, as described above.

Figure 3:
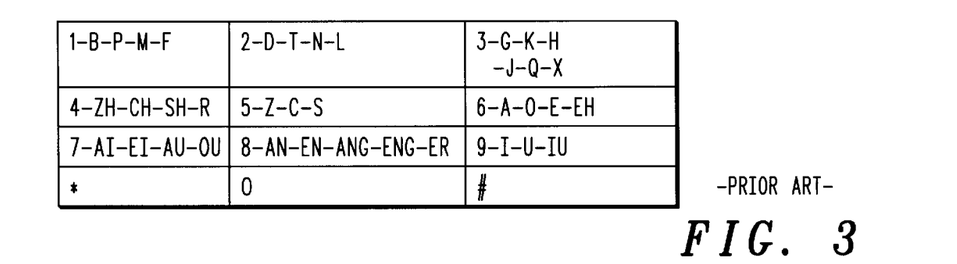
FIGS. 3 and 4 are prior art keypad layouts for the Bopomofo alphabet.

One prior keypad layout for the Bopomofo alphabet is used on the NEC DB2100 mobile phone (FIG. 3). The NEC keypad layout essentially follows that of the typical keypad layout for the Roman alphabet in that the characters are arranged in order on a row-by-row basis. Each commonly known set of characters is on a single key except for key #3 which has two such sets. While this layout is highly regular, it does not consider input effectiveness and thus produces too much ambiguity. In this regard, almost all the twenty possible character combinations provided by the sequence of inputting key #1 followed by key #8 are valid. As is apparent, a given sequence of key inputs with the NEC Bopomofo keypad will not provide much information.

Figure 2:
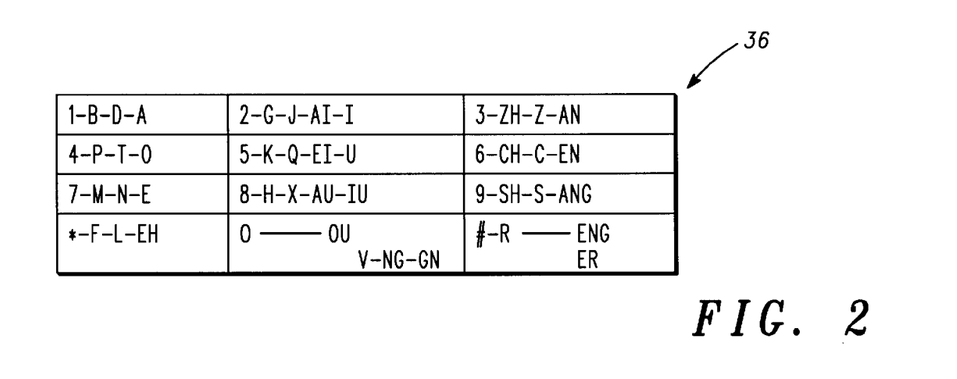
FIG. 2 is a schematic view of the keypad of FIG. 1 showing the Bopomofo characters in their Roman representations.

Another Bopomofo keypad layout is on Motorola's CD928+ mobile phone (FIG. 2). This layout is significantly improved over the NEC keypad in terms of input efficiency as it attempts to distribute conflicting characters, such as those that are in the same character set, onto different keys. On the other hand, this distribution created a messy or irregular arrangement of the characters, and thus one that is difficult to master.

Accordingly, there is a need for a keypad layout having an improved combination of regularity and efficiency for textual input. More particularly, a keypad for Chinese text input, i.e. the Bopomofo phonetic alphabet, is needed having a highly regular and efficient layout.

DETAILED DESCRIPTION OF THE PREFERRED EMBODIMENTS

Figure 1:
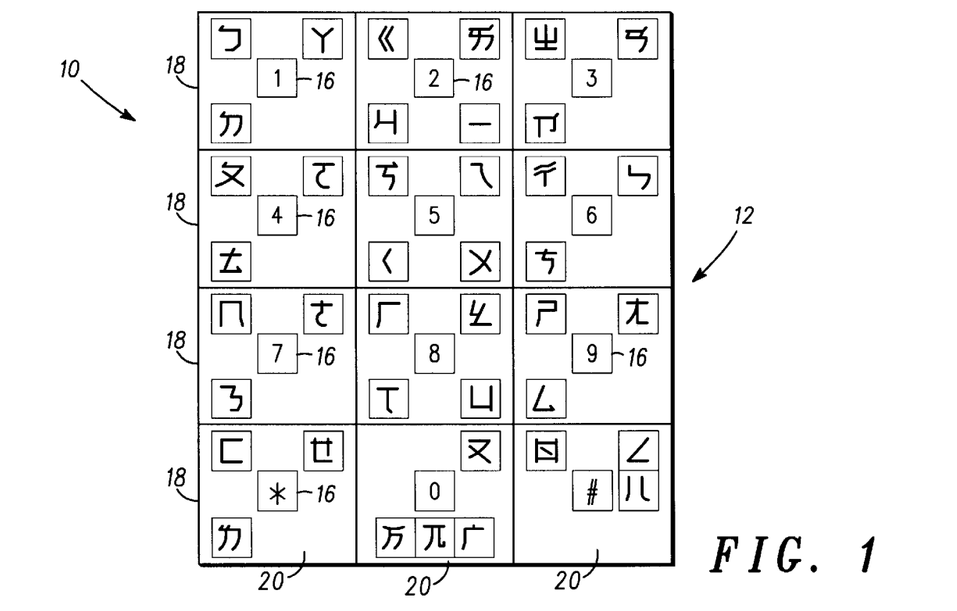
FIG. 1 is a plan view of an alphanumeric keypad having a layout of alphabetic characters of the Bopomofo Chinese phonetic alphabet in accordance with the present invention.
Figure 4:
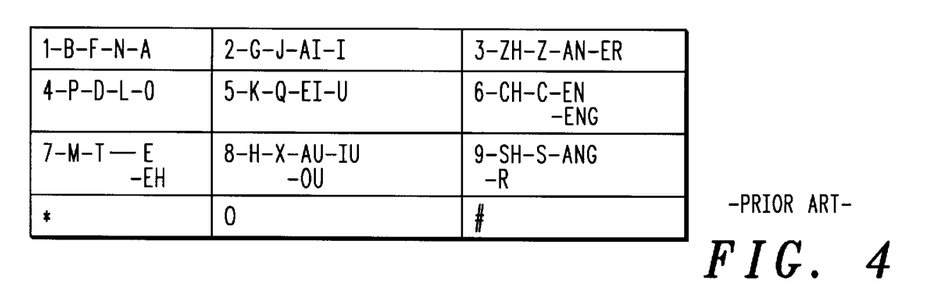
Figure 5:
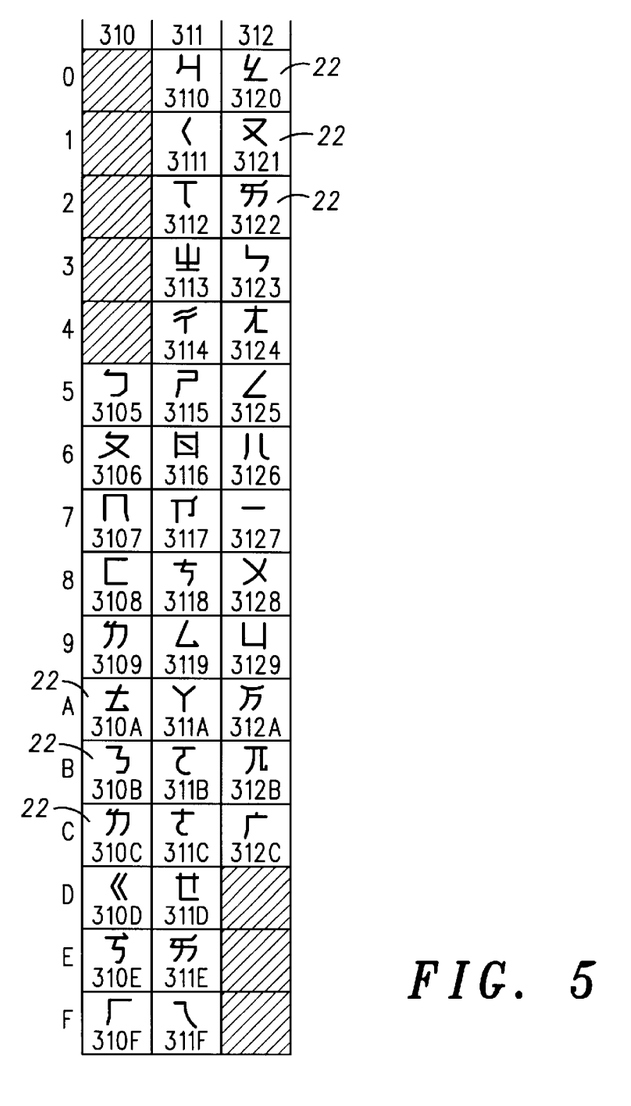
FIG. 5 is a view of the Bopomofo characters and their associated Unicodes from the Unicode Standard.
Figure 6:
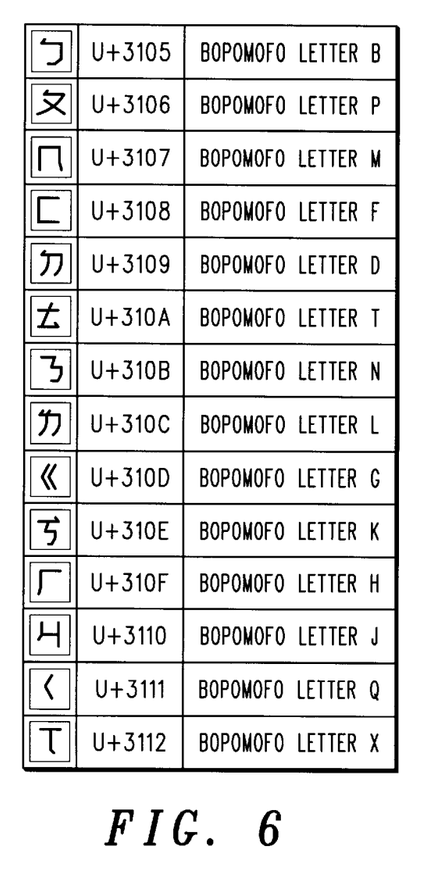
FIGS. 6–8 are views listing the Bopomofo characters, their associated Unicodes and Romanized representations.
Figure 7:
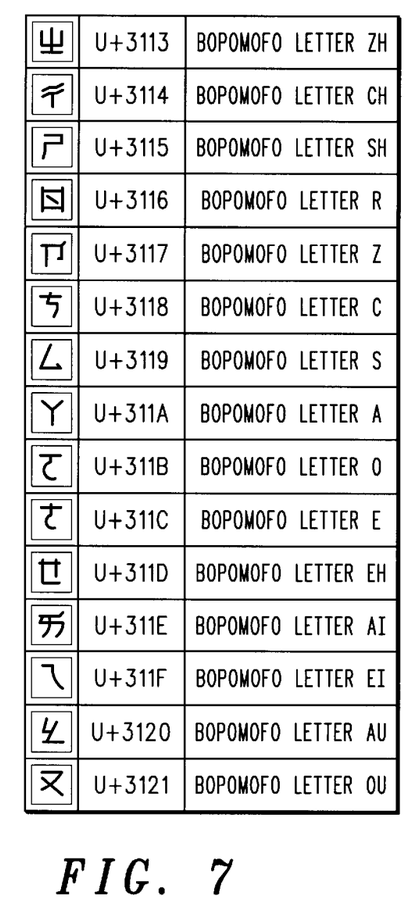
Figure 8:
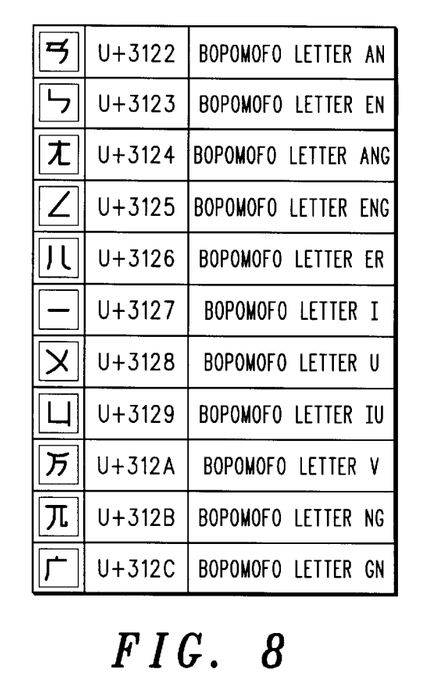

The present layout generally designated 10 for the keypad 12 of FIG. 1 is optimized in terms of both its regularity and efficiency over the prior keypad layouts shown in FIGS. 2 and 3 and 4 described earlier. In this regard, the keypad layout 10 herein is specifically described for use with the Chinese phonetic alphabet, Bopomofo, although it will be recognized that the principles adopted by the keypad layout 10 can also be adapted for use with other types of syllabic based, highly structured languages with alphabets having character groupings including commonly known sets of ordered characters, as described more fully hereinafter. The present keypad layout finds particular utility on keypads 12 of small hand-held, electronic data entry devices such as cellular phones, PDAS, etc. where the number of keys available for alphanumeric input is limited, e.g. 9 to 12 alphanumeric keys.

The keypad layout 10 has a predetermined arrangement of the character sets that is based on a columnar or vertical approach rather than the row-by-row approach of the prior NEC keypad layout. The present keypad layout 10 maximizes its regularity as it utilizes the predetermined ordering of the characters within the sets so their order generally corresponds to the row in which they lie. In other words, the first character of a set will appear in the first row of keys and the last character of the set will appear in the last or lowest row of keys on which characters appear in the column of keys in which the character set is distributed. In this manner, the keypad layout 10 will allow a user to become readily familiar with the location of characters in the keypad 12 so that with use they should be able to increase their speed of character input.

The present keypad layout also employs a highly efficient arrangement or distribution of the commonly used characters from the character groups amongst the keys of the keypad 12 so as to minimize the number of words that are formed by a given sequence of key inputs. To this end, the character sets are arranged so that a single one of the sets of commonly used characters does not appear on a single one of the key as in the prior NEC keypad. Further, the character sets are arranged in predetermined key columns so that characters from the same set do not appear in different key columns as in the prior Motorola keypad. Accordingly, the keypad layout 10 herein achieves a balanced distribution of the commonly used characters from the character groups on the keys including a balanced distribution of the sets in the key columns that allows for a minimum of ambiguity in character input for a given sequence of key inputs. This will reduce the instances of the underlying circuitry having to display multiple words on the screen of the device which, in turn, requires that the user stop their input and choose the word they intended to enter. As is apparent, this undesirably slows the overall process of character data entry. Even if multiple words are possible, their number is reduced with the keypad layout 10 herein contributing to ease and speed of use.

Figure 17:
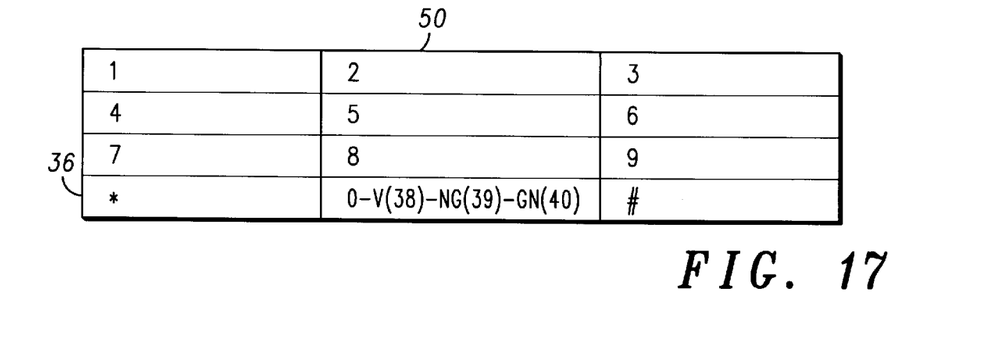
FIG. 17 is a view of the arrangement and distribution of the character set of the obsolete/rare-use group of characters in the keypad layout of FIGS. 1 and 2.

In FIG. 1, the keypad layout 10 in accordance with the present invention is illustrated. The keypad 12 of FIG. 1 is typical for use in hand-held wireless electronic devices 14 schematically illustrated in FIG. 17 having a plurality of keys 16 arranged in predetermined numbers of rows 18 and columns 20. The invention herein relates to arranging and distributing characters 22 of an alphabet such as the Chinese phonetic Bopomofo alphabet on the keys 16 in a highly regular and efficient manner. Herein, it will be understood upon referencing the characters 22 being or appearing on the keys 16, that the characters 22 do not necessarily have to be physically imprinted on the actual keys but rather can appear adjacent to a particular key 16 so that it is associated therewith, as is known.

Figure 18:
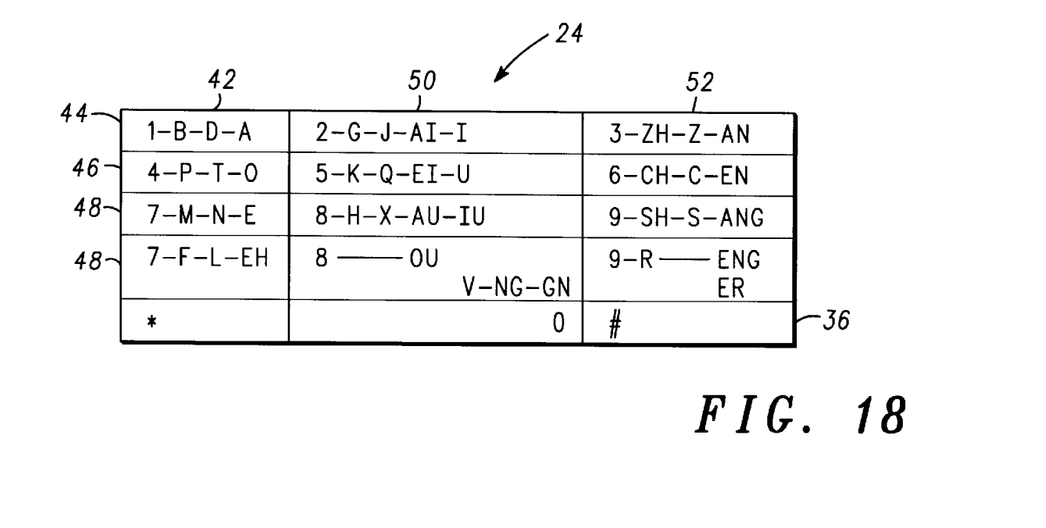
FIG. 18 is a schematic view of an alternative keypad layout for the Bopomofo alphabet in accordance with the present invention.

In the preferred and illustrated form of FIGS. 1 and 2, the keypad layout 10 is implemented on a four row, three column keypad 12 having all twelve keys 16 thereof available for placement of alphabetic characters 22 thereon. FIG. 1 shows the present keypad layout 10 with the characters 22 in their Chinese form with FIG. 2 being the same keypad layout except showing the characters 22 in their Romanized representations. An alternative keypad layout 24 in accordance with the invention with the characters 22 being in their Romanized form is shown in FIG. 18. The alternative layout 24 is for use with keypads 12 where the bottommost row 36 is not available for character input, as will be discussed more fully herein. In either keypad layout 10 or 24 there is much greater regularity than the prior Motorola keypad layout of FIG. 4 and much less ambiguity than the prior NEC keypad layout of FIG. 3.

Figure 9:
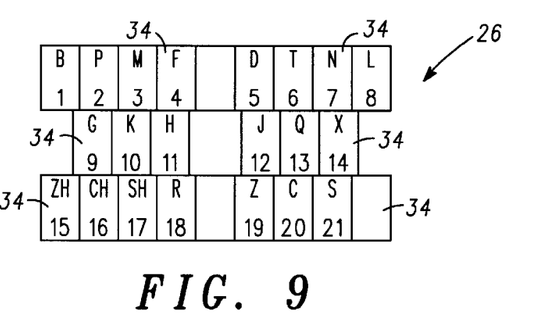
FIG. 9 is a view of a syllable initial group of characters of the Bopomofo alphabet and commonly known ordered character sets thereof.
Figure 10:
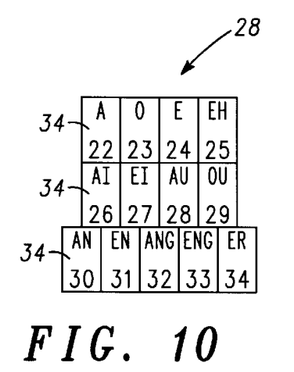
FIG. 10 is a view of a syllable final character group of the Bopomofo alphabet and commonly known ordered character sets thereof.
Figure 11:
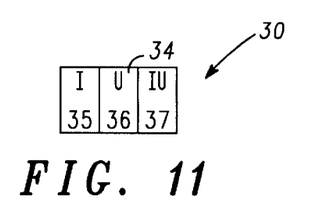
FIG. 11 is a view of a syllable middle character group of the Bopomofo alphabet.
Figure 12:
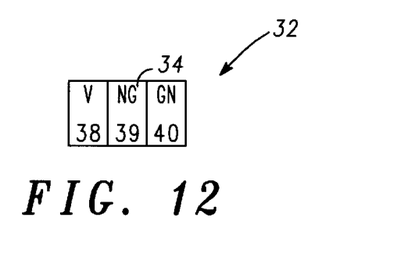
FIG. 12 is a view of an obsolete/rare-use character group of the Bopomofo alphabet.
Figure 13:
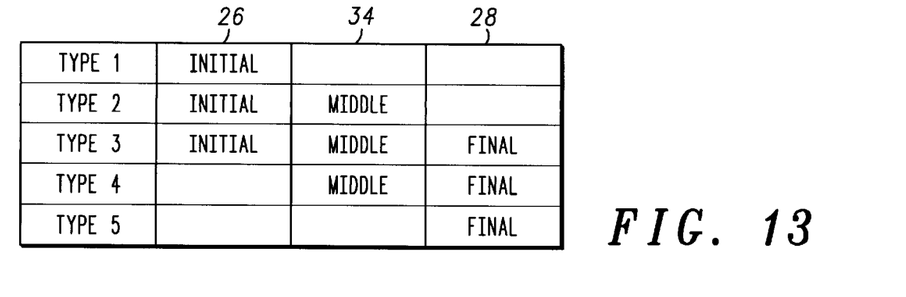
FIG. 13 is a table of the different syllable structures for forming syllables with the Bopomofo characters of the different character groups.
Figure 19:
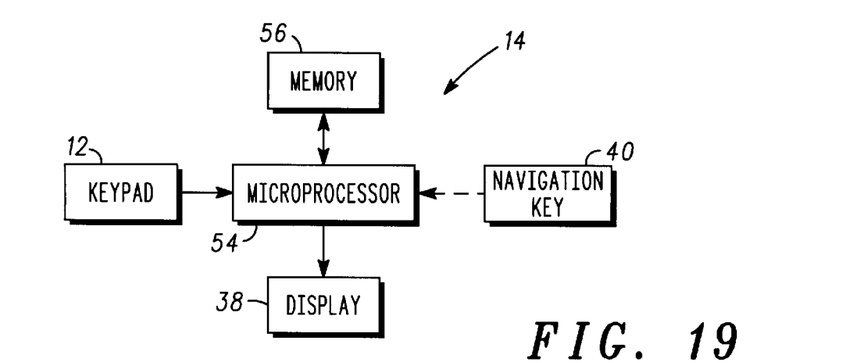
FIG. 19 is a diagrammatic view of the circuitry associated with a data entry device utilizing the keypad and showing a dedicated navigation key separate from the keypad.

Bopomofo symbols or characters 22 are derived from ancient pictorial Chinese characters, and their Romanized representations as given in Unicode Standard is shown in FIGS. 5–8. The Bopomofo alphabet has a set of forty phonetic characters 22 that are arranged in well defined groupings and ordering. Chinese is a syllabic language with a simple and regular structure, and all Chinese syllables can be written with one to three Bopomofo characters 22, as set forth in the table of FIG. 13. In terms of the character groupings, the commonly used characters 22 are organized by their location within the syllable so that there is a syllable initial character group 26 (FIG. 9), a syllable final character group 28 (FIG. 10), and a syllable middle character group 30 (FIG. 11). An obsolete/rare-use character group 32 is shown in FIG. 12. Both the syllable initial and final groups 26 and 28 include multiple smaller sets 34 of their characters 22 that are commonly known as being associated together. The syllable middle and rare-use character groups 30 and 32 have a small number of characters, i.e. three, so that they only have a single such set 34 each. As shown, each set 34 has at least three characters 22 and no more than five characters 22. In addition, the characters 22 have a predetermined ordering with the first twenty-one characters 22 being in the syllable initial group 26, characters twenty-two through thirty-four being in the syllable final character group 28 and the characters thirty-five through thirty-seven being in the syllable middle character group 30. The additional rare-use character group 32 has the three remaining characters 22, thirty-eight through forty. As mentioned, the preferred keypad layout 10 herein is employed with keypad 12 that has all twelve of its keys 16 available for character input. In the prior Motorola keypad layout, the characters 22 are not placed on the bottommost or fourth row of keys 36 because the asterisk key and the pound key in either end column 20 of the row 36 are used as navigation keys. In other words, in a hand-held wireless electronic device 14 such as depicted in FIG. 19, certain of the keys 16 of the keypad 12 have to be employed by a user to traverse to different portions of display screen 38 of the device 14. Accordingly, to implement the preferred keypad layout 10 herein, the device 14 has a separate navigation key 40 that is distinct from the keys 16 of the keypad 12. This allows the keypad layout 10 to maximize the use of the keys 16 for character distribution thereon.

Referring next to FIGS. 14–17, the character sets 34 in each character group 26–30 as well as the rare-use character group 32 are shown. As can be seen, each character set 34 is assigned to a particular column 20. Further, the numerical order of the characters 22 in a set 34 corresponds to the number row 18 in which the characters 22 lie. More specifically and referring to the first character set 34 of the syllable initial character group 26 (B, P, M, F), this set 34 appears in the first, or leftmost column 42. The first character 22, B, appears in the first or topmost row 44; the second character 22, P, appears in the second row 46 immediately below the topmost row 34; the third character 22, M, appears in the third row 48 below the second row 46; and the fourth and last character 22, F, appears in the fourth or bottommost row 36 below the third row 48. In the syllable final character group 28, the first character set 34 (A, O, E, EH) appears in the first key column 42. The first character 22, A, of this set (character number twenty-two in the Bopomofo alphabet order) appears in the first row 44; the second character 22, O, of this set (character number twenty-three in the Bopomofo alphabet order) appears in the second row 46; the third character, E, of this set (character number twenty-four in the Bopomofo alphabet order) appears in the third row 48; and the fourth character, EH, of this set (character number twenty-five in the Bopomofo alphabet order) appear in the fourth row 36. The other character sets 34 have the same top-down ordered arrangement of their characters 22 in the key column 20 in which they lie. The syllable final group 28 has one character set 34 that has a top-down ordered arrangement with a slight modification due to the extra character it contains.

Figure 14:
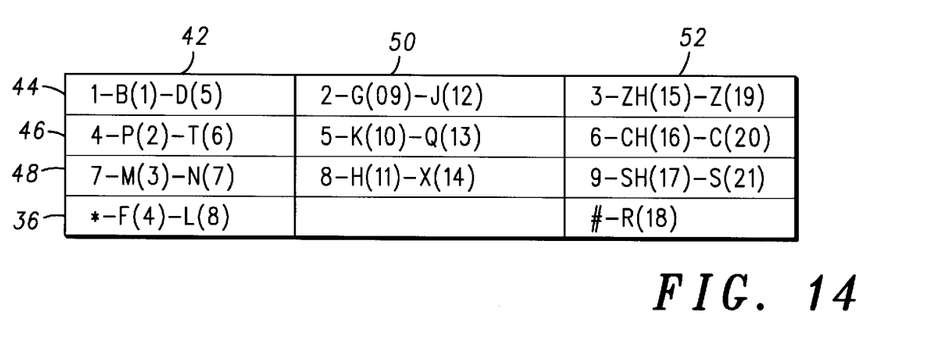
FIG. 14 is a view of the arrangement and distribution of the character sets of the syllable initial group of characters in the keypad layout of FIGS. 1 and 2.
Figure 16:
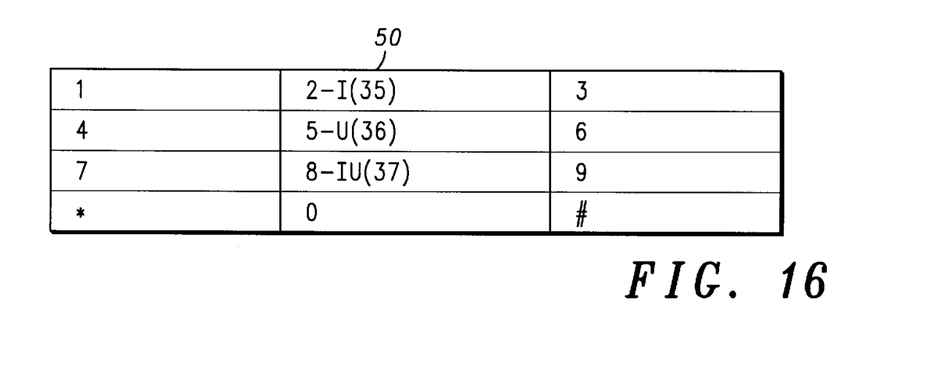
FIG. 16 is a view of the arrangement and distribution of the character set of the syllable middle group of characters.

As can be seen in FIGS. 14 and 16, where the character sets 34 only have three commonly used characters 22, they are arranged in the top three rows 44–48 leaving the bottom row 36 open. With respect to the obsolete/rare-use character group 32, the arrangement of the characters 22 thereof is of less concern as they are not commonly used and thus are provided on a single key 16 in the bottommost row 36, such as in the middle key column 50, intermediate the left end key column 42 and right end key column 52. As mentioned earlier, the layout for the five character set 34 of the syllable final group 28 is slightly modified in that it has its last two characters 22 arranged on the bottommost key 16 in its key column 52 with the preceding characters 22 lying in the row 18 corresponding to their order within the set 34 so that there is still general correspondence between the character ordering and the row 18 in which they appear.

Figure 15:
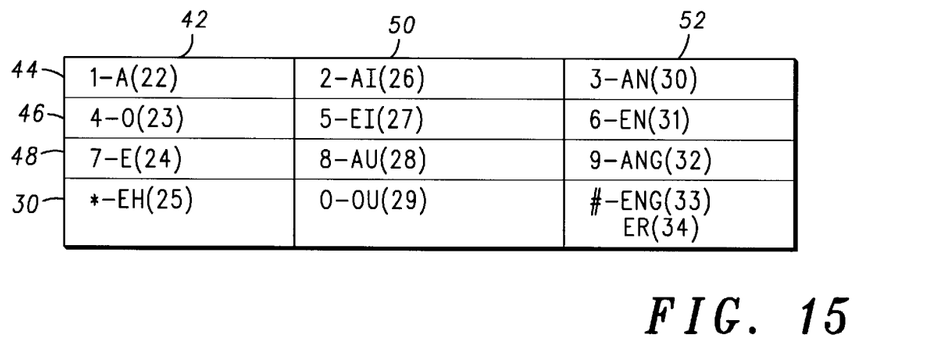
FIG. 15 is a view of the arrangement and distribution of the character sets of the syllable final group of characters in the keypad layout of FIGS. 1 and 2.

Thus, as can be seen in FIGS. 14–16, the character sets 34 in each of the groups 26–30 has a top-down ordered arrangement which will have a high level of intuitive regularity to a user familiar with the commonly known character sets 34 of the Bopomofo phonetic alphabet described herein. More particularly and referring to FIG. 14, there are six syllable initial character sets 34 which are arranged such that there are two character sets 34 per key column 20. There are three syllable final character groups 34 as shown in FIG. 15 such that in the present keypad layout 10 there is one set 34 per key column 20. The syllable middle character group 30 only includes a single character set 34 of three characters 22 which appear in the middle column 50, as best seen in FIG. 16. As these characters 22 are from the syllable middle character group 30, their placement in the middle column 50 further contributes to the intuitive nature of the keypad layout 10 herein.

The above-described arrangement where the character sets 34 are assigned to specific columns 20 such that characters 22 from one set do not appear in different key columns provides the present keypad layout 10 with a high degree of regularity versus the prior Motorola Bopomofo keypad layout. Unlike the prior Motorola keypad layout, the present layout 10 is such that a first character 22 in a given set 34 that is immediately preceding a second or subsequently ordered character 22 in the set 34 does not appear in a key row 18 that is lower than that in which the second or subsequently low ordered character 22 appears. It is believed that the high regularity provided by the present keypad layout 10 will allow a user to more readily familiarize itself with the keypad 12 so that with continued use, they will be able to rapidly increase their character input speed.

Referring next to FIG. 19, the keypad 12 is preferably for use in a wireless, hand-held electronic device 14, although it will be recognized that the layout 10 herein could also be implemented in an alphanumeric keypad 12 such as is provided on a desktop or laptop computer in addition to the main character input keys for two-handed input. In these devices 14, underlying circuitry is provided in a housing for interpreting the data input via the keypad 12 and can include a microprocessor 54 and a memory 56. The memory 56 can store dictionary tables of the different syllables and words of the Bopomofo phonetic language and be programed with software such that when a given sequence of key inputs is made via the keypad 12, the software will retrieve all valid syllable candidates from the stored dictionary tables in the memory 56. It should be noted that the sequence can be a single key stroke where characters 22 stand alone as self-contained syllables, i.e. syllable types 1 and 5 in FIG. 13. These syllables are then combined to form words which are shown on the display 38 on the device housing under control of the microprocessor 54.

To reduce the ambiguity of having a given sequence of key inputs produce several valid syllables and thus potentially several words, there needs to be an efficient distribution of the characters 22 on the keys 16. In this regard, the earlier-described balanced distribution of the character sets 34 amongst the key columns 20 maximizes the efficiency in inputting words via the keypad 12. Unlike the previously-described NEC keypad, there is not a single one of the sets 34 of the commonly used characters 22 in groups 26–30 that appear on a single one of the keys 16. By distributing the commonly used characters 22 so that there is not a concentration of characters 22 of a particular group, such as from the syllable initial group 26 and the syllable final group 28, on a small number of keys 16, there is less likelihood that a given key sequence will produce a large number of valid syllable candidates. Further and as previously discussed, each of the character sets 34 is arranged in a single one of the key columns 20 so that characters 22 from the same set 34 do not appear in different columns 20, as in the prior Motorola keypad. In this manner, except for the character set 34 of the syllable final group 28 including characters numbered thirty through thirty-four, (i.e. AN, EN, ANG, ENG, ER), there are no keys 16 that have more than one commonly used character 22 from a given set 34 thereon.

To further the goal of having a balanced distribution of the commonly used characters 22 amongst the keys 16, there is no more than two commonly used characters 22 from groups 26–30 that appear on a single key 16. More particularly, only characters 22 from syllable initial group 26 are distributed so that two characters 22 from this group 26 appear on the same key 16 due to the large number of characters 22 in group 26. This is a vast improvement from the prior Motorola layout where several keys, i.e. key numbers 1, 4, 9, have three characters from the syllable initial group 26. Also, the present keypad layout 10 only has a single key, i.e. the pound key, with more than one character 22 from the syllable final group 28. By contrast, the prior Motorola layout, has several such keys 16 including key numbers 3, 6, 7 and 8. Thus, the present layout 10 distributes the commonly used characters 22 to minimize the concentration of characters 22 from the same group on a small number of keys 16, or on a single key 16. The present keypad layout 10 has been found on average to have about twenty-five percent less ambiguity than the prior Motorola layout, and is about four times better in terms of input efficiency than the prior NEC keypad layout.

Where the data entry device 14 lacks a separate, dedicated navigation key 40 thus leaving only the first three rows 44–48 available for character input, the keypad layout 24 can be utilized instead of previously-described layout 10 as has been discussed. In devices 14 without a separate navigation key 40, the asterisk and pound key in the bottom row 36 of keys 16 of the keypad 12 are used for navigation. Accordingly, the keypad layout 24 has substantially the same arrangement and distribution of characters 22 as keypad layout 10, except that the characters appearing in the bottommost row 36, as shown in FIG. 2, are all pushed up into row 48, as shown in FIG. 18. Regularity can be maintained by having the characters 22 that precede other characters 22 in their sets 34 appear above these subsequently ordered characters 22 on a single key 16 in bottom key row 36, as is shown in FIG. 18. Thus, this nine key keypad layout 24 has almost the same level of regularity as the layout 10. The keypad layout 24 has a slightly higher level of ambiguity than the keypad layout 10 although it is still considerably better than the prior layouts. To this end, although key number 7 and key number 9 each include more than three characters from the same character group, this is still an improvement over the prior Motorola layout which has three such keys 16, as previously described.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What I claim is:

1. A layout of characters of an alphabet on a keypad that is highly regular for ease of use of the keypad, the keypad layout comprising:

a plurality of keys that are in predetermined numbers of rows and columns for inputting the characters, the plurality of keys being arranged in three columns, and there being two syllable initial characters per key in each column, one syllable final character per key in each column, and one syllable middle character per key in a middle one of the three columns;

predetermined characters groups each having different characters of the alphabet from the other groups so that the characters from one character group can cooperate with the characters of at least one of the other character groups to form syllables;

a predetermined ordering of characters within each of the character groups; and predetermined sets of ordered characters of the character groups that are arranged on keys in predetermined columns so that the order of the characters in the sets corresponds to the row of keys in which the characters lie to maximize the regularity of the characters on the keypad for ease of use thereof.

2. The keypad layout of claim 1 wherein the plurality of keys on which characters appear include twelve keys arranged in four rows by three columns.

3. The keypad layout of claim 1 wherein the alphabet is a Chinese phonetic alphabet so that the syllables formed by the characters in the groups cooperate to form syllables phonetically.

4. The keypad layout of claim 1 including an additional group comprising rare-use characters which are all arranged on a lower key in the middle column.

5. The keypad layout of claim 1 wherein the predetermined sets have a predetermined distribution in the columns that minimizes the number of syllables that are formed by characters on keys in different ones of the columns for maximizing efficiency in inputting words via the keypad.

6. An electronic data entry device having a keypad for inputting characters of an alphabet on keys of the pad in a highly efficient arrangement for minimizing multiple word formation via predetermined sequences of key inputs, the device comprising:

housing including a screen for displaying the characters with the keys being arranged on the housing in a predetermined number of rows and columns;

circuitry configured to interpret predetermined sequences of key inputs for displaying the words formed thereby on the housing screen;

predetermined character groups each having different commonly used characters of the alphabet from the other groups with the characters from one character group cooperating to form syllables with the characters of at least one of the other character groups, the predetermined character groups including predetermined sets or characters; and a predetermined distribution of the commonly used characters from the different character groups to minimize concentration of characters from the same group on the keys for maximizing efficiency in inputting words via the keypad minimizing the number of words formed and displayed on the screen for a given sequence of key inputs, the predetermined character distribution includes an arrangement of the sets in predetermined key columns so that characters from the same set do not appear in different key columns and a single one of the sets of commonly used characters does not appear on a single one of the keys.

7. The electronic device of claim 6 wherein the predetermined character distribution includes no more than two characters from any one of the commonly used character groups on a single one of the keys.

8. The electronic device of claim 6 wherein the housing is for one of a cell phone, a wireless massaging communicator, a memo-writer and a personal digital assistant.

9. The electronic device of claim 6 wherein the keys are arranged in four rows by three columns, and the alphabetic characters appear on each of the keys in a column to maximize use of the keys for character distribution thereon, and a navigation key distinct from the character keys of the keypad to allow a user to traverse to different portions of the screen.

10. The electronic device of claim 9 wherein the characters have a predetermined ordering within their set which corresponds to the row in which the characters lie to maximize the regularity of the characters on the keypad for case of use thereof.

11. The electronic device of claim 6 wherein the keys are arranged in four rows by three columns with the bottommost row of keys lacking alphabetic characters thereon to allow the bottom keys to be dedicated to navigation about the screen.

12. The electronic device of claim 11 wherein the character sets each include no more than five characters with the characters having a predetermined ordering within their group, and the sets including four characters having the last two ordered characters thereof arranged on the key in the third row of the column in which the sets appear, and the set including five characters has the last three ordered characters thereof arranged on the key in the third row of the column in which the set appears.

13. The electronic device of claim 6 wherein the alphabet is a phonetic Chinese alphabet so that the character groups cooperate to form syllables phonetically.

14. The electronic device of claim 6 including an additional group comprising rare-use characters that are arranged on a single lower row, intermediate column key.

15. A hand-held electronic device having a keypad for inputting characters of an alphabet arranged on keys of the pad in a highly regular and efficient layout to optimize user familiarity in ease of use of the keypad and to minimize multiple word formation via predetermined sequences of key inputs, the hand-held electronic device comprising:

a compact housing including a screen thereon for displaying words formed by the inputted characters with the keys arranged in predetermined numbers of rows and columns on the housing, the keys being arranged in three columns;

a plurality of character groupings that are predetermined so that characters of one group can cooperate with characters of at least one other group to form syllables, the characters having a predetermined ordering within each of the character groupings, the character groupings including syllable initial, middle and final groupings;

sets of the ordered characters of the character groupings;

a predetermined arrangement of the character sets in key columns such that a first character in a given set that is immediately preceding a second character in the set will not appear in a key row lower than that in which the second character appears to maximize the regularity of the characters on the keypad for ease of use thereof, the predetermined character set arrangement including two syllable initial characters per key in each column, one syllable final character per key in each column, and one syllable middle character per key in a middle one of the three columns; and a predetermined balanced distribution of the sets of each of the character groupings in the key columns for maximizing efficiency in inputting words via the keypad.

16. The hand-held electronic device of claim 15 wherein the predetermined balanced distribution includes a distribution of the character sets each in a single one of the key columns.

17. The hand-held electronic device of claim 15 including an additional grouping comprising rare-use characters which are all arranged on a lower key in the middle column.

18. The hand-held electronic device of claim 15 wherein the keypad has the keys arranged in four rows by three columns, and the alphabetic characters appear on each of the keys in a column to maximize use of the keys for character arrangement and distribution thereon.

19. The hand-held electronic device of claim 15 wherein the alphabet is a Chinese phonetic alphabet so that the characters in the groupings cooperate to form syllables phonetically.

20. A keypad layout of characters comprising:

a plurality of columns including a plurality of keys, each column including at least one syllable initial character per key and at least one syllable final character per key, and at least one column including a syllable middle character per key.

21. The keypad layout of claim 20, wherein each column includes at least two syllable initial characters per key.

22. The keypad layout of claim 20, wherein each column is associated with one syllable final group.

23. The keypad layout of claim 20, wherein one of the plurality of columns is associated with the syllable middle group.

24. The keypad layout of claim 20, wherein a middle one of the plurality of columns is associated with the syllable middle group.

25. A data entry device having a plurality of keys for inputting characters comprising:

a predetermined character distribution of characters from the different character groups, the predetermined character distribution including an arrangement of character sets in predetermined key columns so that characters from the same character set do not appear in different key columns and a single one of the character sets does not appear on a single one of the keys.

* * * * *

UNITED STATES PATENT AND TRADEMARK OFFICE
CERTIFICATE OF CORRECTION

PATENT NO.    : 6,686,852 B1
DATED         : February 3, 2004
INVENTOR(S)   : Guo, Jin It is certified that error appears in the above-identified patent and that said Letters Patent is hereby corrected as shown below:

Column 8,
Line 45, change "sets or characters" to -- sets of characters --
Line 63, change "massaging" to -- messaging --

Signed and Sealed this

Twenty-fifth Day of May, 2004

JON W. DUDAS
*Acting Director of the United States Patent and Trademark Office*